United States Patent [19]

Miller

[11] 4,094,001

[45] June 6, 1978

[54] DIGITAL LOGIC CIRCUITS FOR COMPARING ORDERED CHARACTER STRINGS OF VARIABLE LENGTH

[75] Inventor: Donald E. Miller, Waynesboro, Va.

[73] Assignee: General Electric Company, Waynesboro, Va.

[21] Appl. No.: 780,446

[22] Filed: Mar. 23, 1977

[51] Int. Cl.² ............................................. G06F 7/22
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,197,742 | 7/1965 | Rettig et al. | 364/900 |
| 3,456,243 | 7/1969 | Cass | 364/900 |
| 3,492,653 | 1/1970 | Fosdick et al. | 364/900 |
| 3,611,314 | 10/1971 | Pritchard et al. | 364/900 |
| 3,634,832 | 1/1972 | Taddei | 364/900 |
| 3,725,870 | 4/1973 | Felcheck et al. | 364/200 |

*Primary Examiner*—Gareth D. Shaw
*Assistant Examiner*—Thomas M. Heckler
*Attorney, Agent, or Firm*—Michael Masnik

[57] ABSTRACT

Apparatus for automatically searching for a string of ordered characters stored on a magnetic tape wherein the string may be of selectable length employing a dynamic buffer register for storing the candidate strings of characters to be searched and a static/dynamic register for use in identifying the ordered reference string of characters used in performing the search, said candidate characters and reference characters being compared on a bit parallel character serial basis, means are provided to successively delay the relative positions of said reference characters and candidate characters in their respective register stages until a comparison indicates that the string of characters identified in the reference register have been located in the candidate register.

17 Claims, 7 Drawing Figures

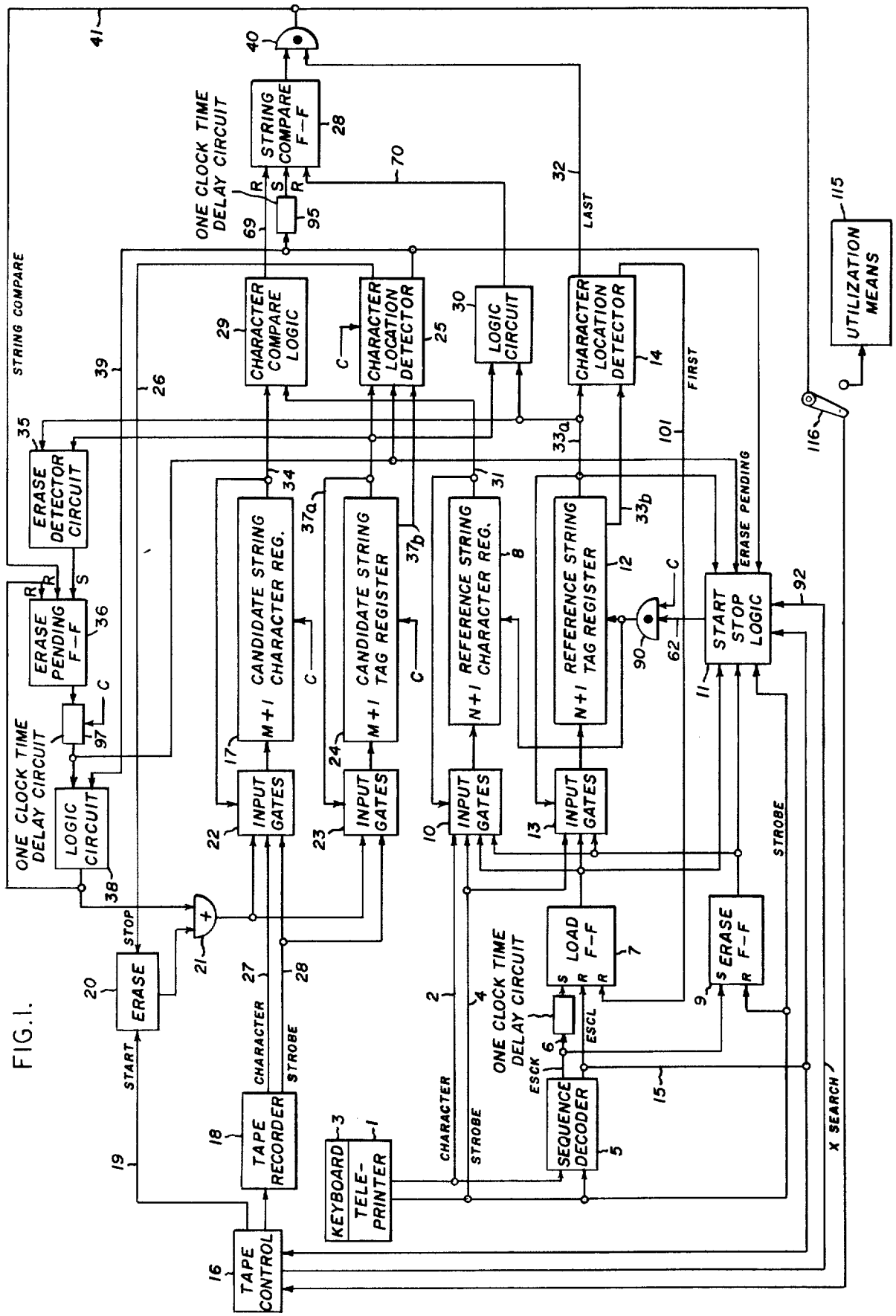

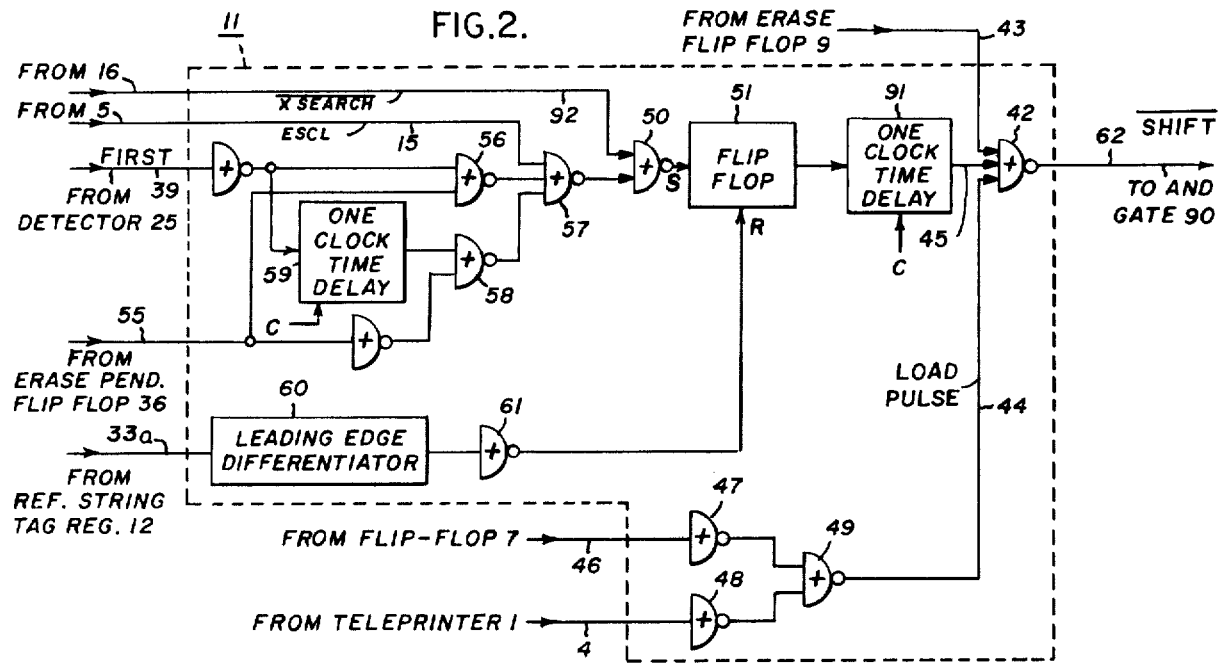
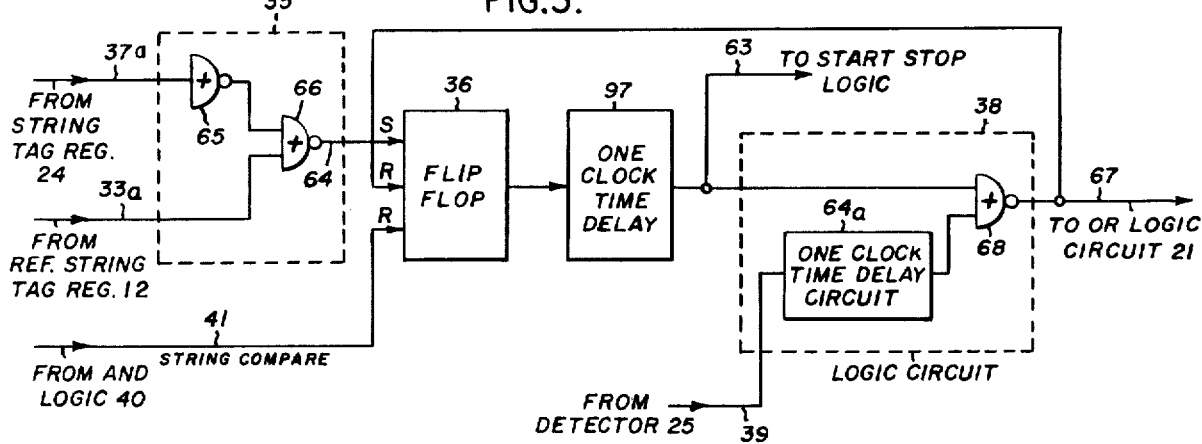
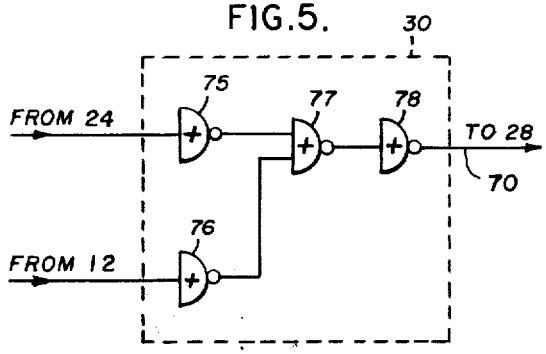
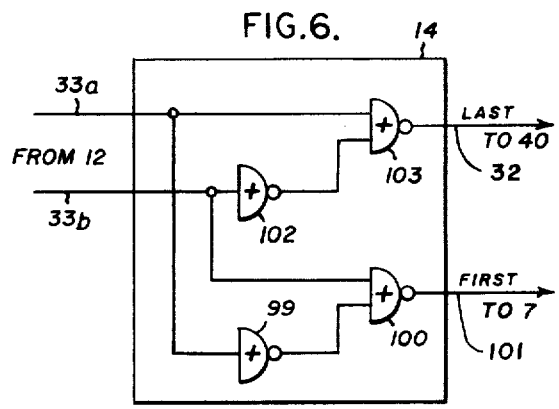

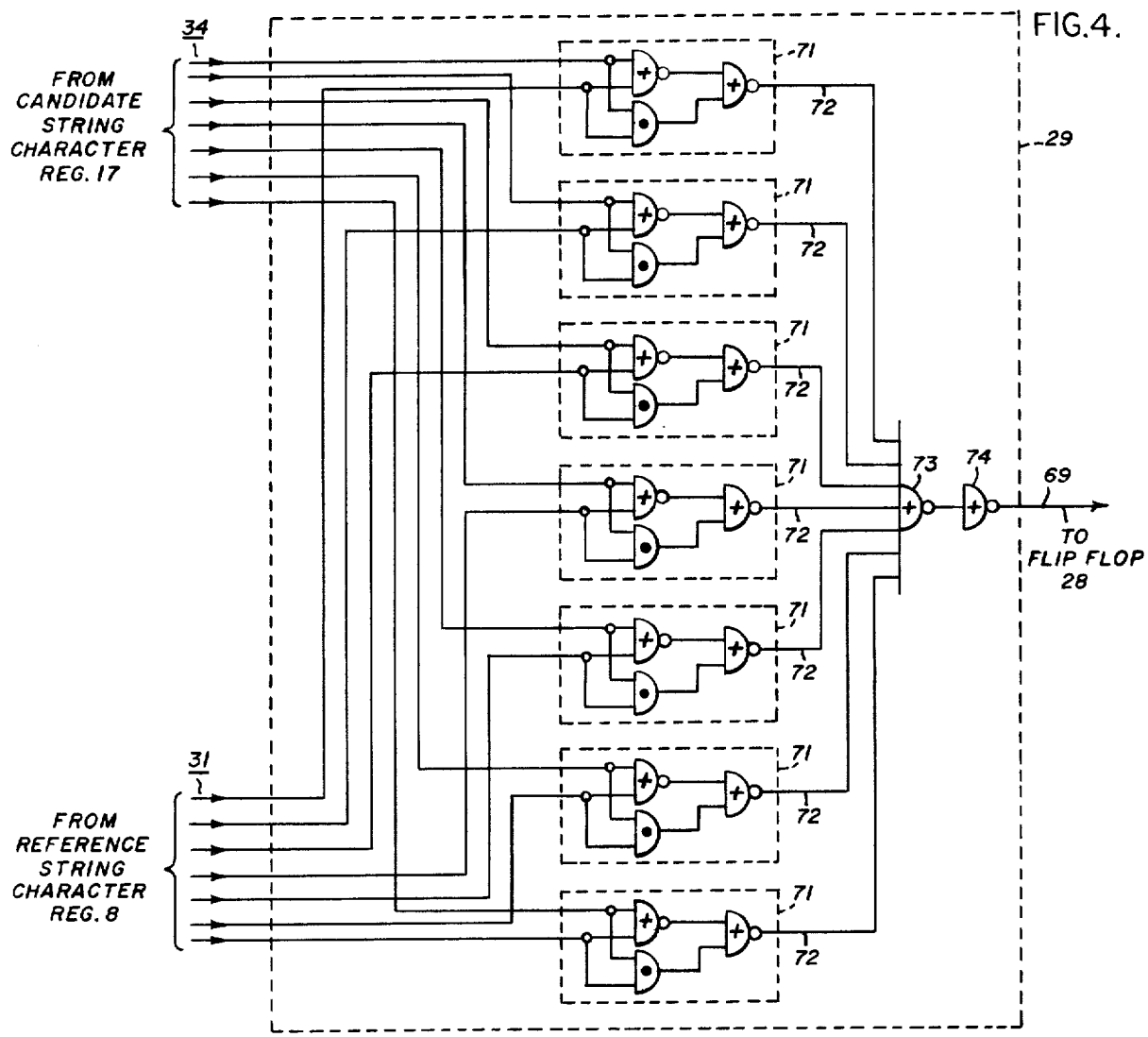
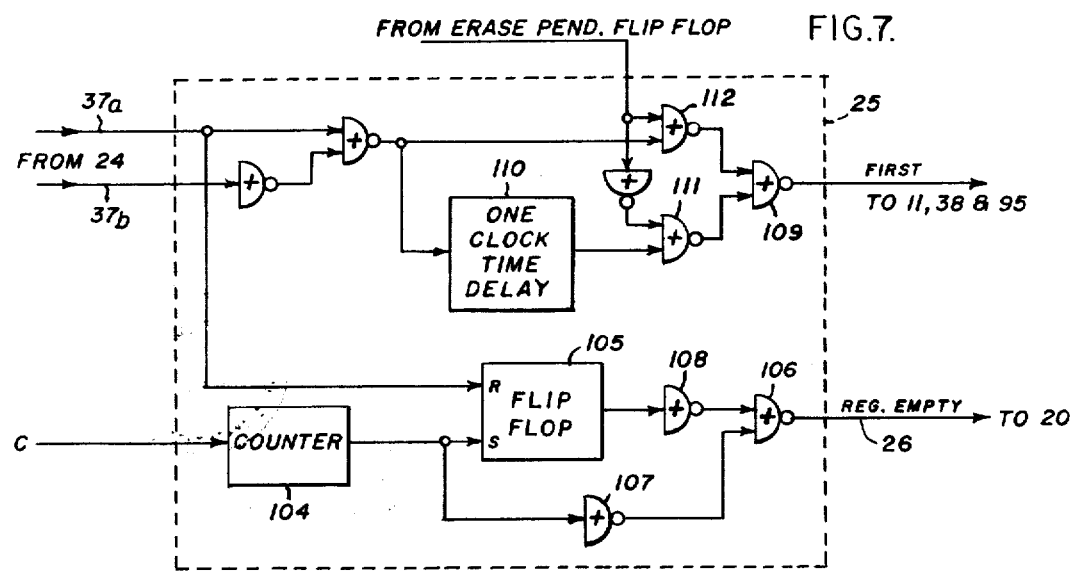

DIGITAL LOGIC CIRCUITS FOR COMPARING ORDERED CHARACTER STRINGS OF VARIABLE LENGTH

BACKGROUND OF THE INVENTION

The present invention relates to digital data processing and more particularly to a method and apparatus for use in automatically searching for a string of ordered characters appearing in a data stream such as from a magnetic tape on a transmission line, etc.

In digital data processing operations it is oftentimes desirable to locate a string of ordered characters stored in some record medium or available from a data source for various purposes such as editing, channeling, processing, etc. Generally this involves providing an ordered string of reference characters which identify the string to be located. The problem of comparing ordered character strings is made more difficult when the strings are of variable length. Various schemes have attempted to deal with this problem. One approach involves the use of binary counters to account for the number of characters to be compared and the number which have been compared. The use of such counters involves several disadvantages, such as additional costs, the inefficient utilization of space and a reduction in reliability.

According, it is one object of this invention to provide an improved arrangement for automatically searching for a string of ordered characters available from a source.

A further object of this invention is to reduce the cost and complexity of circuitry involved in automatically searching for a string of ordered characters of selectable length available from a data source.

A further object of this invention is to utilize the dynamic register, which is otherwise required to buffer the tape recorder or data stream with the readout device, terminal or processor, for storing the string of candidate characters to be searched and a static/dynamic register to store and maneuver a string of reference characters in relation to the candidate character string in the dynamic buffer.

A further object of this invention is to provide improved monitoring status and input/output control of the dynamic register and the static/dynamic register employed in comparing the strings of characters stored in both registers.

Another object of this invention is to provide an improved digital data processing arrangement.

Another object of this invention is to provide an improved control arrangement for automatically searching for a string of ordered characters of selectable length available from a source with a minimum amount of circuitry and improved reliability.

BRIEF DESCRIPTION OF THE DRAWINGS

The features of the present invention believed to be novel are set forth with particularity in the appended claims. The function itself, however, both as to organization and method of apparatus, together with further objects and advantages thereof, may best be understood by reference to the following description taken in conjunction with the accompanying drawings, in which:

FIG. 1 illustrates in part logic diagram, part block diagram form an arrangement for automatically searching for a string of ordered characters of selectable length available from a data source, FIG. 2 illustrates in part block, part logic diagram form details of a start/stop logic circuit 11 used in the arrangement of FIG. 1.

FIG. 3 illustrates in part block, part logic diagram form details of the erase detector circuit 35 and logic circuit 38 shown in FIG. 1.

FIG. 4 illustrates in part block, part logic diagram form details of the character compare logic circuit 29 shown in FIG. 1.

FIG. 5 illustrates the details of logic circuit 30 shown in FIG. 1.

FIG. 6 illustrates the details of character location detector 14 shown in FIG. 1.

FIG. 7 illustrates the details of character location detector 25 shown in FIG. 1.

DESCRIPTION OF THE INVENTION

In accordance with one aspect of the invention there is provided a first circulating storage register for storing a candidate string of ordered characters up to a length of M characters in M + 1 register stages where M is an integral number equal to or greater than 3. A second circulating storage register is provided for storing a reference string of ordered characters up to a length of N characters in N + 1 register stages where N is an integral number equal or greater than 1 and M − N is equal or greater than 2. Means are provided for comparing the candidate strings with the reference string to establish an identity of strings. This is accomplished by providing means for causing the strings to circulate in their respective registers and for comparing said strings in bit parallel, character serial form during circulation to produce a first signal indicative of whether the strings are identical or not. Means are provided for producing a second signal indicative of whether the candidate string is longer than the reference string. When the second signal indicates that the candidate string is longer than the reference string, the relative positions of the characters in the stages of the registers are shifted by at least one stage. Comparing and relative shifting takes place repeatedly until a signal is derived indicating that the strings are identical. When the first signal indicating identity is produced, then the searched for and located string or ordered candidate characters may be processed or utilized as desired. In a particular embodiment to be described, up to 127 characters were circulated in the first register having 128 stages, and up to 125 characters, namely 16, were circulated in a second register having 17 stages.

Referring to FIG. 1, there is shown a source of characters 1 such as a data stream or storage medium, recording medium, etc. For purposes of simplicity, block 18 may be identified as a tape recorder from which a continuous string of characters are available under control of tape control 16 in bit parallel, character serial form with the characters being ordered in the string in a given sequence. Where many such strings of characters are stored in the record medium 18, it is oftentimes desirable to locate a particular string of characters. In order to accomplish this, a string of characters is stored in the dynamic circulating shift register 17 in its ordered sequence as will be described shortly. In a particular embodiment register 17 contained 128 stages so that a substantial string of characters could be stored therein. For purposes of discussion let us assume that a given string of characters is desired to be located in the characters available from the record medium 18. In the arrangement shown in FIG. 1, keyboard 3 produces at its output a string of reference character signals applied at the input gates 10 associated with a dynamic/static search register 8 and the reference character signals are shifted in their ordered sequence into this register with the first character appearing at the output stage of register 8. In a particular embodiment, register 8 contained 17 stages. The candidate character string stored in register 17 is constantly circulating under control of clock pulses C available on an input lead as shown. At an appropriate time the circulation of reference characters in register 8 is initiated and the characters appearing at the output stages of registers 17 and 8 are successively compared in circuit 29 for an identity of a complete string of candidate characters appearing in 17 corresponding to those identified in register 8. If no such identity occurs and if the candidate string is longer than the reference string, then the relative positions of the characters in the stages of registers 8 and 17 are shifted by one stage, and shifting continued until a signal is produced at the output of 40 indicating that the strings in 17 and 8 that have been compared are identical. The output signal from 40 is then applied to tape control 16 to control the operation of the data source 18 or to another utilization device such as 115 by operation of switch 116. Means 115 could be an alarm or printer, etc. Under these circumstances therefore, register 17 contains the string of characters sought for and identified by the character strings stored in register 8. The operator can then decide what he needs to do with the data that has been located. For example, the data stored in 17 could be the address associated with following data located in the tape recorder 18 which the operator is interested in obtaining or processing.

First, it may be desirable to provide a brief description of the use of this character string search as used in this implementation. In one embodiment, the sequence of operating the two keys ESC and K in sequence was selected to carry out an erase and a data store function, and the ESC and L to carry out a character search. The operator would first depress the ESC and K keys, in that order, on the teleprinter keyboard which erases any existing reference character string and enables the storing of a new reference character string. The operator then enters the new reference character string from the keyboard. This string may include any combination of up through 16 characters, excluding the double ordered sequences ESC,K and ESC,L. The operator then enters the sequence ESC,L in that order. The ESC,L sequence terminates the reference character string and causes the tape transport to search for the location of the string. When the string is found, the transport stops. The operator may than edit or process the data at his discretion. The reference character string is retained in the reference register to be used for subsequent searches.

It may be desirable to briefly review the general function of the circuit of FIG. 1 to facilitate later, more detailed explanation. In response to the operation of the keyboard 3, teleprinter 1 will produce characters ESC and K in a coded format, for example, as a standard ASCII code. Normally this is a ten bit code, but for simplicity of discussion, we will refer only to the seven bits defining the character itself and not the start and stop bits or the parity bits. Also reference will be made to "lead" in the specification. This is intended to mean either a single or plurality of connections or couplings depending upon whether a signal involves a single or a plurality of components. An example of the latter is data in bit parallel format. Following the production of the seven bit code representing any character, a strobe pulse is delivered on lead 4. Thus the character representing the escape key (ESC) operation appears on lead 2 followed by the strobe signal appearing on lead 4. Similarly the K character signal in encoded format appears on lead 2 followed by the strobe pulse appearing on lead 4. Upon detection in decoder 5 signals on leads 2 and 4 result in a detected escape K signal or pulse being developed on lead 6. This signal through erase flip-flop 9 causes reference string character register 8 and reference string tag register 12 to be erased of their content. The signal on lead 6 also conditions the load flip-flop 7 for enabling the loading of a new reference string of characters and reference string tag signals to be inserted into registers 8 and 12. The operator uses the keyboard 3 to type in the new reference string of characters. This results in teleprinter 1 sending coded pulses representing the reference string characters over lead 2 along with their respective strobes on lead 4 to the reference string character register 8 through input gates 10. The strobe signals on lead 4 accompanying the reference string signals appearing on lead 2 cause the loading of tag signals in register 12 through the input gates 13. The strobe signals available on lead 4 applied to start/stop logic circuit 11 cause clocking via AND gate 90 of both the reference string characters available on lead 2 and the strobe signals on lead 4 into their respective registers 8 and 12. Strobe signals being applied over lead 4 to start/stop logic 11 also causes the erase flip-flop to be reset to prevent erasure of information being introduced into registers 8 and 12.

Typing in of escape L by the operator on keyboard 3 causes the printer 1 to deliver an escape L coded sequence to decoder 5. Upon decoding in 5, a control signal is delivered over lead 15 to the tape control unit 16. Tape control 16 corresponds to the signal on lead 15 to cause a control signal to be delivered over lead 19 to the erase circuit 20. This signal causes erasure of all of the characters and tags signals appearing in registers 17 and 24 before the tape recorder 18 responds to the control signal from tape control 16 to begin delivering the new candidate string of characters and the associated strobe signals over leads 27 and 28 to the input gates 22 and 23. Registers 17 and 24 circulate continuously under the control of clock signals C applied thereto. The strobe signal on lead 28 causes gate 22 to begin admitting character signals available from tape recorder 18 on lead 27 to register 17. Also the strobe signals on lead 28 applied through input gates 23 cause tag signals to be entered into the register 24. Tag signals in registers 24 and 12 are associated with a respective character signal circulating in their associated registers 17 and 8. It should be noted that the character and tag signals in registers 8 and 12 had been advanced toward their output stage under the control of the start/stop logic 11 and are resting there awaiting loading of the character and tag signals into registers 17 and 24. When the first tag signal has been advanced through register 24 to its output stage it is detected by detector 25 to produce a signal on lead 39. This signal causes start/stop logic circuit 11 to begin circulating the character and tag signals in registers 8 and 12 in synchronism with that of the other registers 17 and 24. Character signals in registers 17 and 8 are compared in the character compare logic circuit 29 and string compare circuit 28 to produce an indication on lead 41 when there is an identity of the string of character signals stored in 17 and 8. This indication is utilized to stop the tape recorder 18 through tape control circuit 16. If there is no equal compare of all of the characters in the string of characters selected from registers 17 with the string of characters in register 18, this is indicated by the state of circuits 28 and 40 and no signal is furnished over lead 41 for operating control 16 to halt further readout from tape recorder 18. Thus, character signals continue to be read from tape recorder 18 into the register 17 for comparison with the string of characters circulating in register 8. If an equal compare does occur, then as previously indicated, a signal is developed on lead 41 for causing control 16 to stop recorder 18. Conditions can be reached where the number of characters stored in register 17 is greater than the number of characters stored in register 8. When this condition occurs, it is detected by circuit 35 to cause the first character stored in register 17 to be erased by circuit 36. Now, comparisons can take place between the registers 17 and 8 with the character signals in register 17 shifted relative to the character signals in register 8 by one character. The comparison rate is much greater than the tape recorder read-out rate such that one or more string comparisons can take place before the next character is entered from the tape recorder. In one embodiment the comparison rate or data circulation rate was 100,000 characters per second whereas the characters were available from the recorder 18 at only 500 characters per second. This relative shifting of characters in registers 17 and 8 continues to take place until there is an equal compare of a string of characters. When this occurs, the signal on lead 41 causes the tape control 16 to stop the tape recorder 18 thereby identifying the position on the tape of the successful candidate string. If further details of the operation of registers such as 17 or 24 and the manner in which data is inputted into and out of these registers is desired, reference may be made to the U.S. Pat. of Donald S. Lindsay, No. 4,012,721, allowed Sept. 27, 1976 and to be issued Mar. 15, 1977 entitled "Digital Logic Circuit for Dynamic Buffer Register" which is assigned to a common assignee. Also reference may be made to U.S. Pat. No. 3,995,252 which includes a more detailed discussion of data formats, clocking, data strobing, basic logic circuits, etc., involving concepts and techniques now well known in the art.

Reference is now made to FIG. 1 for a more detailed description of the various structural components illustrated therein.

In accordance with one aspect of the invention, as previously mentioned, there is provided a first continuously circulating storage register for storing a candidate string of ordered characters up to a length of M characters in M+1 register stages. A second dynamic/static storage register is provided for storing a reference string of ordered characters up to a length of N characters in N+1 register stages. Means are provided for comparing the candidate strings with the reference string to establish an identity of strings. This is accomplished by providing means for causing the strings to circulate in their respective registers and for comparing said strings in bit parallel, character serial form during circulation to produce a first signal indicative of whether the strings are identical or not. Means are provided for producing a second signal indicative of whether the candidate string is longer than the reference string. When the first named signal indicates no identity and second named signal indicates that the candidate string is longer than the reference string, the candidate string is shifted by one character in relation to the reference string. Comparing and relative shifting takes place repeatedly until first named signal indicates that the strings are identical.

In order to track the candidate string in its register and the reference string in its register, two tag registers are provided. One tag register is associated with the candidate string register while the other tag register is associated with the reference string register. Simultaneous to loading a character in either of the aforementioned registers, a tag signal is loaded into the appropriate tag register. These tag registers circulate with their associated register, thus providing means for tracking the character strings in each register.

Referring to the implementation of the invention shown in FIG. 1, the delimiters (ESC,K; ECS,L) and the reference ordered character string are generated by the teleprinter 1. These characters could be generated manually from the keyboard 3 or by some remote teleprinter, processor, or data source. The above mentioned characters may be received over many lines in bit parallel or character serial format or over one serial character line 2 in bit serial format as shown in FIG. 1. These characters are framed by a character strobe 4 which indicates exactly when the characters are on the line. Thus far these represent well known data communication techniques.

When the ESC,K character sequence is received over character line 2 accompanied by strobe pulses on character strobe line 4, the character sequence is recognized by sequence decoder 5 which generates an ESCK signal 6 indicating the detection of such a sequence. Detectors for this purpose are well known and reference may be made to U.S. Pat. No. 3,934,228 issued to Paul J. Moran on Jan. 20, 1976 and entitled "Parallel Interface With High Speed Printer" for further details. This ESCK signal 6 is used to set the erase flip-flop 9 which via input gates 10 and 13 and start/stop logic 11 erases all characters and associated tags of any old reference string retained in reference string register 8 or reference tag register 12. This is accomplished by the input gates 10 and 13 inserting no character signals and no tag signals into the first stages of the reference character register 8 and reference tag register 12 respectively as start/stop logic 11 circulates the two registers together. The ESCK signal 6 also sets load flip-flop 7 which allows a new character string to be loaded into register 8.

The strobe signal on character strobe line 4 which frames the first character in the reference string will reset the erase flip-flop 9. Load flip-flop 7, being set at this point in the discussion, will permit input gates 10 to allow the character to appear at the input of the first stage of reference string register 8.

The reference string tag register 12, as discussed above, provides means for determining if and where character signals are in reference string register 8. Simultaneous to loading the first character signal into the first stage of reference register 8, a tag signal is loaded into the first stage of register 12. This process is stimulated by the strobe on line 4 and controlled by input gates 13 via load flip-flop 7. The tag is propagated to the output of the first stage in register 12 under control of start/stop logic 11 as the first character is propagated in register 8.

Subsequent character signals in the reference string and their associated tag signals are loaded into registers 8 and 12 respectively in a manner identical to that described above for the first character. Each character and tag signal is propagated one stage when a new character is entered into the input stage. This results in the reference string being lined up in register 8 in the order it is received from the teleprinter 1.

The reference string register 8 is one stage longer than the maximum number of characters allowed to be stored. This is required in order to provide means of determining which character is the first character in the string and which character is last. This requirement means that from 1 to N stages of the reference string register 8 and tag register 12 have no character or tag signals in them at this point in the reference string loading process. These empty stages of registers 8 and 12 are those nearest the output stage at this point in the loading process.

If the reference string register 8 and its tag register 12 are loaded with N characters, the condition is indicated by the status of the signals on leads 33a and 33b and detected by the character location detector 14 which resets the load flip-flop 7 to disallow loading any more characters.

The ESC,L character signal sequence and its associated strobe signal are received over leads 2 and 4 respectively as was described above for the ESC,K character sequence. This character sequence, ESC and L, marking the end of the reference character string, is detected by sequence decoder 5 which generates the ESCL signal 15. The ESCL signal 15 resets the load flip-flop 7 (if it hasn't already been reset by the full reference string register 8 condition discussed above). The ESCL signal 15 also stimulates the start/stop logic 11, to propagate the reference string and associated tags down to the end of their registers 8 and 12 respectively until the first character of the reference string appears at the reference string register output 31 as detected by start/stop logic 11 from the reference tag register output 33. The ESCL signal 15 further stimulates the tape control 16 to erase the candidate character string register 17 and activate the tape recorder 18. Tape control 16 also delivers an X SEARCH signal to circuit 11 indicating that tape search is in progress. Tape control 16 provides a start erase signal 19 to erase circuit 20 which via "OR" logic 21 provides input gates 22 and 23 within signals required to erase candidate string register 17 and candidate string tag register 24 respectively. Erasing the candidate character string register 17 and its associated tag register 24 is accomplished by logic gates 22 and 23 inserting no characters and no tags into the first stage as the clock signal C continuously circulates these registers. This erasing action continues until character location detector 25 detects that registers 17 and 24 are empty, and generates an empty register signal 26 to stop the erasing. This erasing action will be completed because of the high circulation rate before the tape recorder 18 has had time to have read character signals from tape and put them and their associated strobe signals on serial character lead 27 and strobe lead 28 respectively.

When the first character signal of the candidate string has been read from tape and appears on serial character lead 27 simultaneously with its strobe signal on strobe lead 28, the strobe signal will enable input gates 22 and 23 to put the character signal and an associated tag signal at the input of the first stage of the candidate string register 17 and the candidate string tag register 24 respectively. For further details of this operation, reference may be made to the aforementioned patent of Donald S. Lindsay.

The character and associated tag signals will immediately start propagating down their respective registers synchronous with the clock signal C. When this character and tag has propagated through M+1 stages and arrived at the last stage outputs 34 and 37 respectively, the tag signal stimulates the character location detector 25 to indicate on lead 39 that this first character signal of the candidate string is at its output register. This first signal on 39 causes start/stop logic 11 to circulate the reference string in register 8 in synchronism with the clock signal C and thus with the candidate character signal in register 17. The first signal on 39 also sets the string compare flip-flop 28.

As the candidate string (only one character at this point in the discussion) and the reference string are circulated in their respective registers, along with their associated tag signals in their registers, character compare logic circuit 29 compares each corresponding character of each string; that is, first character of candidate string with first character of reference string, second with second, etc. If the character compare logic 29 finds two characters which are not identical, it generates a signal on a lead connected to R which resets string compare flip-flop 28. Simultaneous with the comparing action of logic circuit 29, the logic circuit 30 is inspecting the tag register outputs 37a and 33a to determine if there is a character in the reference string but none in the candidate string. If logic circuit 30 finds this condition, it generates a signal on a lead connected to R which will also reset string compare flip-flop 28.

When the last character of the reference character string appears at its register output 31, a last signal on lead 32 is generated by character location detector 14 from the reference tag register outputs 33a and 33b. This last signal on 32 is used to test the condition of string compare flip-flop 28 by "AND" logic 40. If string compare flip-flop 28 has been found set, the two strings are identical.

If string compare flip-flop 28 has been found reset, the strings are not identical. As these two strings continue circulating synchronously in their registers, the candidate string may receive from 18 a second character signal when the first character signal is in the second stage from the input end of the candidate string register 17 in the same manner as the first character signal was received from the tape recorder 18. Also, since the reference register 8 is shorter than the candidate register 17, the first character signal of the reference string will appear at its register output 31 before the first character signal of the candidate string propagates to its register output 34. When the first character signal of the reference string appears at the reference string register output 31, start/stop logic 11 detects the condition from reference tag register output 33a and stops the circulation of the reference string character register 8 and reference string tag register 12. The reference string then waits for the candidate string to catch up.

As subsequent character signals are read into the candidate character string register 17 from tape recorder 18, the cycle discussed above is repeated, comparing the two strings each time the registers complete one circulation. Since the character reading frequency is less than the candidate string register cycle frequency, the strings are compared at least each time a new character is loaded into candidate string register 17 from the tape recorder 18.

As the two registers and their associated tag register cycle together, comparing character signals and loading new character signals into candidate register 17, assuming that the two strings do not compare, the candidate register 17 will eventually have one more character signal in it than the reference string register 8. The erase detector circuit 35 will detect this condition by sensing the candidate string tag register output 37a and the reference string register output 33a. This condition will be detected when the last character of the candidate string is at its register output 34, thus the erase cannot be performed immediately. Erase detector circuit 35, upon detecting that the stored candidate string has one more character than the reference string, causes the erase pending flip-flop 36 to be set. The erase pending condition is maintained in its flip-flop 36 until the first character signal of the candidate string appears at its register output 34. This condition is sensed by character location detector 25 which via logic circuit 38, and "OR" logic 21 stimulates the input gates 22 and 23 to block circulation of that excess character signal into the input stages of registers 17 and 24. If the erase were not pending, start/stop logic 11 would start circulating the reference string register 8 at the time the first character of the candidate string appears at its register output 34, but this action is delayed until the second character appears at output 34 by the set condition of erase pending flip-flop 36 acting on start/stop logic 11. Thus the above discussion has erased the first character signal from the candidate string and shifted the relative position of the two strings. That is, it compares the second character signal of the candidate string with the first character signal in the reference string, the third with the second, etc. If the erase were not pending, the string compare flip-flop 28 would be set when the first character signal of the candidate string appears at its register output 34. This action is delayed by the set condition of the erase pending flip-flop 36 until the second candidate string character signal appears at the candidate string register output 34. The erasing action provided by logic circuit 38 also resets erase pending flip-flop 36 preparing for a new erase-shift cycle. Thus, during the erase-shift process described, the character and string comparing continues as before.

The cycling will continue until the string compare flip-flop 28 is found to be set when the last character of the reference string appears at its register output 31.

Finally, when a string identity is found, as determined by logic circuit 40, the string compare signal 41 immediately resets the erase pending flip-flop 36 to prohibit erasing the first character of the successful candidate string. String compare signal 41 signals tape control 16 that it has found an identity. Tape control 16 then directs start/stop logic 11 to stop circulating the reference string with the candidate string and signals the tape recorder 18 to stop. Thus the tape signals have been searched until a character string has been located corresponding to that represented by the reference string stored in register 8.

Details of the start/stop logic 11 in FIG. 1 are shown in FIG. 2. Wherever desirable, common reference numerals have been retained. The output signal SHIFT 62 is used only for circulating registers 8 and 12 shown in FIG. 1. When SHIFT 62 is a logic "0", the registers shift in synchronous with clock C. Via "OR" gate 42; any of the three signals ERASE FLIP-FLOP output 43, LOAD PULSE 44 or rotate flip-flop output 45 will drive SHIFT 62 to a logic "0". Thus, any of these three aforementioned signals will shift the registers 8 and 12 shown in FIG. 1.

The erase flip-flop output 43 acts to shift the registers any time the erase flip-flop is set and thus circulate the registers while blocking circulation of character signals into the input stage of the register.

Load pulse 44 is generated from the strobe line 4 which is a logic "1" only when a character is on character lead 2 (FIG. 1). However, strobe line 4 generates a load pulse 44 only when the load flip-flop is set as indicated by its output signal 46. Thus via inverters 47 and 48 and "NOR" gate 49, the load flip-flop signal 46 is a permissive for strobe lead 4 to generate load pulse 44. This combination of signals provides means for shifting the character and tag signals in registers 8 and 12 of FIG. 1 respectively as they are loaded from teleprinter 1 of FIG. 1.

The combination of flip-flop 51 and delay circuit 91 causes the registers 8 and 12 of FIG. 1 to circulate continuously one clock time after the flip-flop 51 is set. Acting through "NOR" logic gate 50, the signal XSEARCH on 92 indicating a search mode state, which is a logic "0" when searching is in progress, permits the signal ESCL on 15 or the signal on 39 (indicating that the first candidate character signal is at the output of 17) to set the flip-flop 51. The ESCL signal on 15 causes the reference string to shift into a ready position with the first character at its register output. The ESCL signal on 15 will be active (logic "1") only for this initializing period and thus not interfere with subsequent shifting. First signal 39 is used to start the circulation of the reference string when either the first or second character of the candidate string is at its register output. If there is no erase pending, as indicated by erase pending flip-flop signal on 55, the flip-flop 51 is set via gates 56 and 57 when the first character of the candidate string appears at its register output. If there is an erase pending, the first signal 39 is delayed for one clock time by delay circuit 59 thus generating a signal which is active when the second character of the candidate string is at its register output. This delayed signal acts through gates 57 and 58 to set the flip-flop 51.

Having discussed the use of first signal 39 and erase pending flip-flop signal 55 to set flip-flop 51, it should now be pointed out that the XSEARCH signal on 92 is used to prohibit circulating the reference string after a string identity is obtained as indicated by string compare 41 (FIG. 1) acting through tape control 16 (FIG. 1) and finally driving XSEARCH 92 to a logic "1" to indicate the search is over.

The flip-flop 51 is reset by a signal derived from the reference string tag register output 33a. This signal on 33a is a logic "1" all the time the candidate string characters are at their register output. Leading edge differentiator circuit 60 generates a pulse when the register output 33a goes from a "0" to a "1", and through inverter 61 resets flip-flop 51 when the first character of the reference string is at its register output.

The erase detector circuit 35, erase pending flip-flop 36 and logic circuit 38 shown in FIG. 1 are shown in more detail in FIG. 3.

Referring to FIG. 3, the erase detector circuit 35 is driven by the candidate string tag register output 37a and reference string tag register output 33a. When register output 37a is a logic "1" and register output 33a is "0", indicating a character at candidate register output 34 (FIG. 1) but no character at reference register output 31, (FIG. 1) erase detector circuit 35 produces a signal 64 via gates 65 and 66 to set erase pending flip-flop 36.

The erase pending flip-flop 36 is reset by the string compare signal 41 or AND logic circuit output on 67. The string compare signal 41 resets erase pending flip-flop 36 to prevent erasing the first character of the successful candidate string. The "AND" logic circuit output 67 resets erase flip-flop 36 when the pending erase condition has been implemented.

The delayed erase pending flip-flop output is used to drive the start/stop logic 11 (FIGS. 1 and 2) as well as logic circuit 38. Acting through gate 68 the delayed erase pending flip-flop output on 63 permits first signal on 39 to erase the first character of the candidate string. The first signal on 39 is a logic "1" when the first character is at the stage preceding its register output, thus it must be delayed by one clock time in order to act when the first character is at its register output. Means for delaying the first signal on 39 are provided by delay circuit 64a. Thus the first character of the candidate string is erased by signal 67 which also resets erase pending flip-flop 36 when the erase is implemented.

The character compare logic 29, logic circuit 30, character location detector 14 and character location detector 25 shown in FIG. 1 are shown in greater detail in FIGS. 4–7 respectively.

The first signal on 39 acts to set flip-flop 28 when the first character of the candidate string is at its register output. In order for this to occur, it is necessary to delay the first signal 39 for one clock period in 95. This arises from the fact that the first character is detected by character location detector 25 one clock time before the character appears at its register output representing one register stage prior to the output stage by virtue of connections 37a and 37b. This flip-flop will be reset by character compare logic output 69 or logic circuit 30 output on 70.

Character compare logic provides means for producing the signal 69 any time the character at the candidate string register output is different from the character at the output of the reference string register. These characters are stored in their registers by a seven bit logic representation. Character compare logic circuit compares each bit of the candidate character with the corresponding bit of the reference character. Exclusive "OR" circuits 71 provide means of producing signals 72 which go to a logic 1 any time the two bits at its inputs are different. "NOR" gate 73 provides means to drive signal 69 to logic 1, via inverter 74, when any of its inputs are at a logic 1. Thus signal 69 will be driven to a logic "1" when any of the corresponding character bits are different. Signal 69 is then used to reset the string compare flip-flop.

Logic circuit 30 shown in FIG. 5 compares the tag register output of the reference string with the candidate string. Inverters, 75, 76 and 78 along with NOR gate 77 combined as shown in FIG. 5 provides means of producing a signal on 70 any time either or both of the two registers have no character signal in them. This action resets the string compare flip-flop when the candidate string has less characters than the reference string.

FIG. 6 further illustrates the details of block 14. When the states of signals at 33a and 33b are 0 and 1 respectively, indicating that the first character of candidate string is at the one stage before the output stage of its register, inverter 99 and NOR gate 100 generate the FIRST signal on lead 101. When the states are 1 and 0 respectively, indicating that the last character is at the output stage of its register, inverter 102 and NOR gate 103 generate the LAST signal on lead 32.

FIG. 7 further illustrates the details of character location detector 25. The register empty signal on lead 26 activates erase 20 to stop erasing when no characters have been detected as represented at the register 24 output for a time period greater than the time for one complete circulation of data in 17. In one embodiment involving a 100,000 character/second circulation rate and a memory capacity of 127 characters, the time period was selected to be 2–4 milliseconds. The signal is generated as follows. Counter 104 counts clock pulses C to produce a periodic logic 1 output pulse of 10 microsecond duration every 2 milliseconds. This period pulse set flip-flop 105 which causes it to remain set until the next 2 ms pulse appears provided the register is empty. Thereupon the next 2 ms pulse will produce a logic 1 pulse at the output of NOR gate 106 after inversion in 107. This indicates the register is empty. If the register is not empty, a logic 1 pulse will reset 105 and produce a logic 0 state at the output of NOR 106 after inversion in 108. As previously mentioned with respect to detector 14, logic 1 signal is developed at the output of NOR gate 109 when the first character is at the one stage before the output stage of its register. If the erase pending flip-flop 36 is not set (logic 0), a logic 1 signal is developed at the output of NOR gate 109, indicating that the first character to be compared will appear at its register output after one clock time. If the erase pending flip-flop is set (logic 1), the logic 1 signal at 109 is delayed by one clock time in 110 such that it appears at the output of NOR gate 109 indicating that the first character to be compared (which is now the second character in the string) will appear at its register output after one clock time. When the erase pending flip-flop output is at a logic 0, NOR gate 111 is blocked, and when it is at a logic 1, NOR gate 112 is blocked.

Reference has been made to registers as circulating storage registers, it should be realized that these are intended to include dynamic memories or storage devices such as, for example a delay line, incremental shift register, etc.

While the invention has been described with particular reference to the construction shown in the drawings, it is understood that further modification may be made without departing from the true spirit and scope of the invention, which is defined by the claims appended hereto.

What I claim as new and desire to secure by Letters Patent of the United States is:

1. Data processing system comprising a first continuously circulating storage register for storing a candidate string of ordered character signals having a length equal or less than M characters in M + 1 register stages, where M is an integral number equal to or greater than 3, a second circulating storage register circulating upon command for storing a reference string of ordered character signals having a length equal to or less than N characters in N + 1 register stages where N is an integral number equal to or greater than 1 and M − N is equal to or greater than 2, means for comparing a candidate string of character signals stored in said first register with a reference string of character signals stored in said second register to indicate any identity of stored strings of character signals comprising first means for causing said stored strings of candidate and reference character signals to synchronously circulate in their respective registers, means for comparing said last named circulating strings of signals in character serial form to produce a first signal indicative of whether said strings of signals are identical or not, means for sensing that the number of character signals in said circulating candidate string of character signals is greater than the number in said circulated reference string of character signals to produce a second signal, second means responsive to said second signal and to said first signal for delaying circulation of reference character signals in said second register for a sufficient time to cause the relative positions of the candidate and reference character signals in the stages of their respective registers to be shifted by an integral number of stages greater than zero, means for causing said first means, said second means, said means for comparing and said means for sensing to repeatedly perform their function until a first output signal is produced indicative that the strings of signals are identical, and means for utilizing said last named output signal.

2. A system according to claim 1 comprising means responsive to said first signal indicating that the stored strings of signals are not identical and to said second signal to erase the first character in said candidate string of characters from said first register.

3. A system according to claim 1 further comprising a source of candidate character signals, means for serially storing said last named signals in said first register, means for serially comparing the character signals of said strings circulating in said registers to produce a non-identical character compare signal whenever the compared characters are not identical, said seond means comprising a flip-flop circuit, means for producing a signal corresponding to the first character of said stored candidate string of characters, means responsive to said last named signal for setting said flip-flop to a first state, means responsive to any non-identical compare signals to set said flip-flop to a second state, means responsive to the last character of said stored reference string of characters for identifying the state of said flip-flop, and means responsive to said identified state being said first state for controlling said means for serially storing candidate characters from said source into said first circulating register.

4. A system according to claim 3 comprising means for identifying the first character signal of said stored candidate string of character signals appearing at an output stage of said candidate character register, said last named means comprising a candidate tag register, means for providing a respective candidate tag signal associated with each character signal stored in said candidate character register, means for storing said candidate tag signals in said candidate tag register, means for circulating said stored candidate tag signals in said candidate tag register in synchronism with the circulation of the associated candidate character signals stored in said candidate character register, and means for detecting the last candidate tag signal appearing at an output stage of said candidate tag register.

5. A system according to claim 4 comprising means for identifying the first character signal of said stored reference string of character signals appearing at an output stage of said reference character register, said last named means comprising a reference tag register, means for providing a respective reference tag signal associated with each reference signal stored in said reference character register, means for storing said reference tag signals in said reference tag register, means for circulating said stored reference and candidate tag signals and said entered candidate and reference character signals in their respective resisters in synchronism, and means for detecting the last reference tag signal appearing at an output stage of said reference tag register.

6. A system according to claim 5 further comprising means for serially comparing the tag signals circulating in said reference and candidate tag signal registers to produce a non-identical tag signal compare output signal whenever said compared tag signals are not identical, and means responsive to said non-identical tag signal compare output signal to set said flip-flop to said second state.

7. A system according to claim 5 comprising means for controlling the circulation of reference tag signals and reference character signals in their respective registers comprising means responsive to a signal indicating that the first character of said candidate string of characters is appearing at an output stage of said candidate character register for starting circulation of reference characters in said reference character register, and means responsive to a signal indicating that the first character of said reference string of characters has completed one circulation in said reference character register and is appearing at an output stage of said reference character register for stopping circulation of reference characters in said reference character register.

8. A system according to claim 7 further comprising a source of reference character signals, means for storing a string of reference character signals of selectable length from said source into said reference character register comprising a source of beginning signals representing the beginning of a new string of reference character signals, a source of end signals representing the end of a new string of reference character signals, means responsive to said beginning signal for erasing any reference character signals and reference tag signals stored in said reference character and reference tag registers, means responsive to said end signal for shifting said last named new string of character signals into said reference character register with the characters stored in the proper order and the first character of said new string of characters appearing at an output stage of said reference character register, and means responsive to said end signal for erasing any candidate character and candidate tag signals stored in said candidate character and tag registers respectively.

9. A system according to claim 8 wherein said end and beginning signals are represented by a respective ordered multiple character signal, said means responsive to said end and beginning signals comprising means for character sequence decoding said end and beginning signals to provide signals enabling candidate character signals positioned between said beginning and said end signals to be searched in a predetermined order.

10. A data processing system comprising a first memory for storing a string of M candidate character signals in M + 1 memory cells where M is an integral number equal to or greater than 3, a second memory for storing a string of N reference character signals in N + 1 memory cells where N is an integral number equal to or greater than 1 and M − N is equal to or greater than 3, each of said character signals comprising a coded pulse group representing a character, means for providing a respective reference tag signal associated with each reference character signal stored in said second memory, means for providing a respective candidate tag signal associated with each candidate character signal stored in said first memory, a third memory for storing M candidate tag signals, a fourth memory for storing N reference tag signals, means for causing said candidate character signals, said candidate tag signals, said reference character signals, and said reference tag signals to circulate in their respective memories in synchronism in the order in which they were received, means responsive to predetermined one of said candidate tag signals to start the circulation of signals in said second and fourth memories, means responsive to said predetermined ones of said reference tag signals to stop circulation of signals in said second and fourth memories, means normally inoperative for comparing said candidate and reference character signals character by character to provide first output signals indicative of whether said compared candidate character and reference character signals are equal, means responsive to predetermined ones of said candidate tag signals to render said last named means operative to begin comparing said candidate and reference character signals, means responsive to said first output signals for providing a second output signal indicating whether said compared string of candidate and reference character signals are equal, and means responsive to said second output signal indicating equality of said compared strings for utilizing said compared string of candidate character signals.

11. A system according to claim 10 comprising means for sensing the length of said candidate tag and reference tag signals to provide a third output signal indicating that the string of candidate characters is longer than the string of reference characters, means responsive to said second output signal indicating non-equality of said compared strings and said third output signal for shifting the relative positions of the character signals stored in said first and second memories by one character position.

12. An arrangement for searching for a string of ordered character signals stored on a magnetic tape wherein the string may be of selectable length comprising a dynamic register for storing strings of candidate character signals to be searched, a static/dynamic register for storing a string of reference character signals of selectable length, a reference tag register for storing a string of reference tag signals each corresponding to a reference character signal stored in said reference character register, a candidate tag register for storing a string of candidate tag signals each corresponding to a candidate character signal stored in said candidate character register, means responsive to a predetermined one of said signals available from said candidate tag register for initiating the circulation of signals in said registers in synchronism, means for comparing said strings of candidate character and reference character signals character by character appearing at an output stage of said candidate character and reference character registers to provide identical character comparison signals, and means responsive to a predetermined one of said signals available from said reference tag register and responsive only to identical comparison signals for all character signals in said string of candidate character signals compared with said string of reference character signals for providing a utilization signal.

13. A system for searching for a string of ordered character signals available from a source wherein the string may be of selectable length comprising a candidate character memory for storing strings of candidate character signals to be searched a reference character memory for storing a string of reference character signals of selectable length, a reference tag memory for storing a string of reference tag signals each corresponding to a reference character signal stored in said reference character memory, a candidate tag memory for storing a string of candidate tag signals each corresponding to a candidate character signal stored in said candidate character memory, said memories being recirculating memories, means responsive to a predetermined one of said tag signals available from said candidate tag memory for initiating the circulation of candidate and reference character signals and candidate and reference tag signals in their respective memories in synchronism, means for comparing said strings of candidate character and reference character signaals character by character appearing at an output stage of said candidate character and reference character memories to provide identical character comparison signals, and means responsive to a predetermined one of said tag signals available from said reference tag memory and responsive only to identical comparison signals for all character signals in said string of candidate character signals compared with said string of reference character signals for providing a utilization signal.

14. A system according to claim 13 further comprising means for reading character signals available from said source and storing said read signals as they are being read in and candidate character memory, means for utilizing said utilization signal comprising means for stopping the reading of further character signals available from said source.

15. A system according to claim 14 comprising means coupled to said candidate tag and reference tag memories for providing a first control signal indicating that the string of candidate character signals is greater than said string of reference character signals, means coupled to said candidate tag memory for providing a second control signal indicating that the first candidate character signal is at an output stage of said candidate character memory, and means normally inoperative for erasing said first candidate character signal stored in said candidate character memory and its associated candidate tag signal stored in said candidate tag memory, said last named means responsive to said first and second control signals and the absence of said utilization signal for becoming operative to erase said last named candidate character and candidate tag signals.

16. An arrangement according to claim 15 comprising means responisve to said first control signal and said second control signal and the absence of said utilization signal for shifting the relative positons of the character signals stored in said candidate character memory and said reference character memory and their associated tag signals stored in said candidate tag memory and said reference tag memory.

17. An arrangement according to claim 16 wherein said means for shifting shifts the relative positions of the enumerated signal by one character position.

* * * * *

UNITED STATES PATENT OFFICE
CERTIFICATE OF CORRECTION

Patent No. 4,094,001     Dated June 6, 1978

Inventor(s) Donald E. Miller

It is certified that error appears in the above-identified patent and that said Letters Patent are hereby corrected as shown below:

Col. 9, line 60, cancel "SHIFT" and insert -- $\overline{\text{SHIFT}}$ --
Col. 9, line 62, cancel "SHIFT" and insert -- $\overline{\text{SHIFT}}$ --
Col. 9, line 66, cancel "SHIFT" and insert -- $\overline{\text{SHIFT}}$ --
Col. 10, line 20, cancel "XSEARCH" and insert -- $\overline{\text{XSEARCH}}$ --
Col. 10, line 44, cancel "XSEARCH" and insert -- $\overline{\text{XSEARCH}}$ --
Col. 10, line 48, cancel "XSEARCH" and insert -- $\overline{\text{XSEARCH}}$ --
Col. 13, line 31, cancel "seond" and insert -- second --
Col. 16, line 5, after "searched" insert -- , --
Col. 16, line 20, cancel "signaals" and insert -- signals --

Col. 16, line 54, cancel "responisve" and insert -- responsive --

Signed and Sealed this

Twelfth Day of June 1979

[SEAL]

Attest:

RUTH C. MASON
Attesting Officer

DONALD W. BANNER
Commissioner of Patents and Trademarks